(12) United States Patent
Oka

(10) Patent No.: US 11,221,016 B2
(45) Date of Patent: Jan. 11, 2022

(54) CENTRIFUGAL COMPRESSOR

(71) Applicant: MITSUBISHI HEAVY INDUSTRIES COMPRESSOR CORPORATION, Tokyo (JP)

(72) Inventor: Hiroaki Oka, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 17/076,137

(22) Filed: Oct. 21, 2020

(65) Prior Publication Data

US 2021/0123453 A1 Apr. 29, 2021

(30) Foreign Application Priority Data

Oct. 24, 2019 (JP) .............................. JP2019-193448

(51) Int. Cl.
*F04D 29/28* (2006.01)
*F04D 17/12* (2006.01)
*F04D 29/44* (2006.01)

(52) U.S. Cl.
CPC ......... *F04D 29/284* (2013.01); *F04D 17/122* (2013.01); *F04D 29/441* (2013.01); *F05D 2250/52* (2013.01); *F16C 2360/44* (2013.01)

(58) Field of Classification Search
CPC .... F04D 29/284; F04D 17/122; F04D 29/441; F05D 2250/52; F16C 2360/44
See application file for complete search history.

(56) References Cited

U.S. PATENT DOCUMENTS

| 2016/0281727 | A1 | 9/2016 | Lardy et al. |
| 2018/0209728 | A1* | 7/2018 | Iurisci ................... F25J 1/0055 |
| 2018/0347571 | A1 | 12/2018 | Yamashita |
| 2021/0040958 | A1* | 2/2021 | Sorokes ................. F04D 17/10 |

FOREIGN PATENT DOCUMENTS

| EP | 3351882 A1 | 7/2018 |
| JP | 2018-510289 A | 4/2018 |
| WO | 2019-160550 A1 | 8/2019 |

* cited by examiner

*Primary Examiner* — Audrey B. Walter
*Assistant Examiner* — Edward Bushard
(74) *Attorney, Agent, or Firm* — Osha Bergman Watanabe & Burton LLP

(57) ABSTRACT

A centrifugal compressor includes a rotary shaft rotating around an axis, and a plurality of impellers fixed to and integrally rotating with the rotary shaft so that a gas flowing from an upstream side in an axial direction is compressed by being pumped outward in a radial direction. At least one of the plurality of impellers has a design point of a flow rate coefficient φ which is 0.1 to 0.2, and a machine Mach number M0 of 1.1 to 1.3 and is configured to be operable between a flow rate coefficient minimum value φmin and a flow rate coefficient maximum value φmax. An operation range expressed by the following Equation (a) is 30% or higher, (Operation Range)={(Flow Rate Coefficient Maximum Value φmax)−(Flow Rate Coefficient Minimum Value φmin)}/(Flow Rate Coefficient Maximum Value φmax) (a).

4 Claims, 3 Drawing Sheets

CENTRIFUGAL COMPRESSOR

BACKGROUND OF THE INVENTION

Field of the Invention

The present disclosure relates to a centrifugal compressor.
Priority is claimed on Japanese Patent Application No. 2019-193448, filed on Oct. 24, 2019, the content of which is incorporated herein by reference.

Description of Related Art

For example, in a centrifugal compressor for compressing a gas (process fluid), Published Japanese Translation No. 2018-510289 of the PCT International Publication discloses a supersonic compressor in which a flow velocity of the compressed gas is a supersonic velocity.

SUMMARY OF THE INVENTION

Incidentally, in the centrifugal compressor in which the flow velocity of the gas is the supersonic velocity as described above, an operation range tends to be narrowed when a Mach number of the gas in an impeller has a high value. Here, the Mach number is expressed by the following Equation (1).

$$(\text{Mach number}) = (\text{Relative Velocity of Gas(impeller Peripheral Velocity)})/(\text{Sonic Velocity of Gas}) \quad (1)$$

In addition, the operation range is a range from a flow rate coefficient minimum value (flow rate coefficient minimum value $\varphi min$) that maximizes a performance (pressure coefficient) of the centrifugal compressor to a flow rate coefficient maximum value (flow rate coefficient maximum value $\varphi max$) when a choke phenomenon occurs so that an operation can be performed no longer with the flow rate coefficient and is expressed by the following Equation (2).

$$(\text{Operation Range}) = \{(\text{Flow Rate Coefficient Maximum Value } \varphi max) - (\text{Flow Rate Coefficient Minimum Value } \varphi min)\}/(\text{Flow Rate Coefficient Maximum Value } \varphi max) \quad (2)$$

For example, in a case where the centrifugal compressor is used for an ethylene plant or a liquefied natural gas (LNG) plant, the molecular weight of the compressed gas is relatively high. In a case where the gas has a high molecular weight, the Mach number of the gas has a particularly high value, and the operation range of the centrifugal compressor tends to be narrowed.

The present disclosure provides a centrifugal compressor capable of improving performance while securing an operation range even in a case where a Mach number of gas is high.

In order to solve the above-described problem, a centrifugal compressor according to the present disclosure includes a rotary shaft which is configured to rotate around an axis, and a plurality of impellers fixed to and which is configured to integrally rotate with the rotary shaft so that a gas flowing from an upstream side in an axial direction is compressed by being pumped outward in a radial direction. At least one of the plurality of impellers has a design point of a flow rate coefficient $\varphi$ which is 0.1 to 0.2, and a machine Mach number $M0$ of 1.1 to 1.3, is configured to be operable between a flow rate coefficient minimum value $\varphi min$ and a flow rate coefficient maximum value $\varphi max$, and has an operation range expressed by the following Equation (a) is 30% or higher.

$$(\text{Operation Range}) = \{(\text{Flow Rate Coefficient Maximum Value } \varphi max) - (\text{Flow Rate Coefficient Minimum Value } \varphi min)\}/(\text{Flow Rate Coefficient Maximum Value } \varphi max) \quad (a)$$

According to the centrifugal compressor of the present disclosure, even in a case where the Mach number of the gas is high, performance can be improved while the operation range is secured.

DETAILED DESCRIPTION OF THE INVENTION

Hereinafter, an embodiment for implementing a centrifugal compressor according to the present disclosure will be described with reference to the accompanying drawings. However, the present disclosure is not limited only to the embodiment.

(Configuration of Compressor System Apparatus)

Hereinafter, the centrifugal compressor according to the embodiment of the present disclosure will be described with reference to FIGS. 1 to 3.

Figure 1:
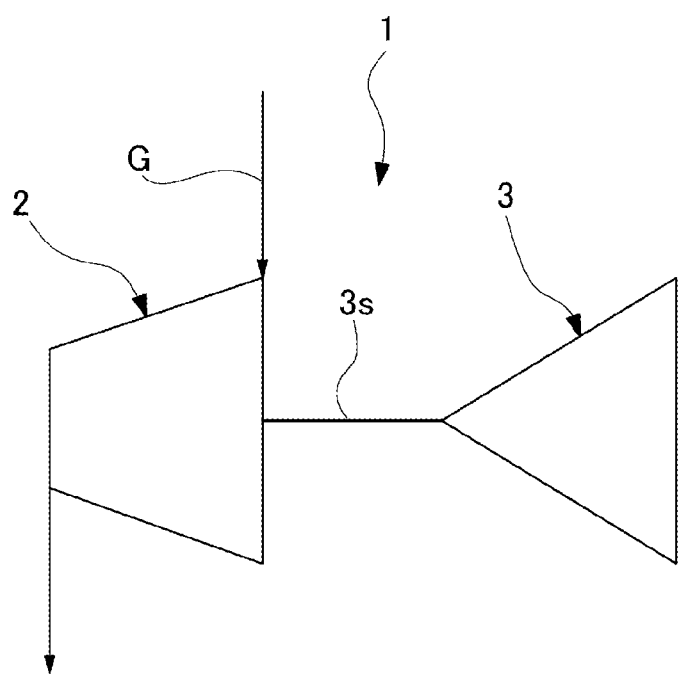
FIG. 1 is a schematic view illustrating a configuration of a compressor system including a centrifugal compressor according to an embodiment of the present disclosure.
Figure 2:
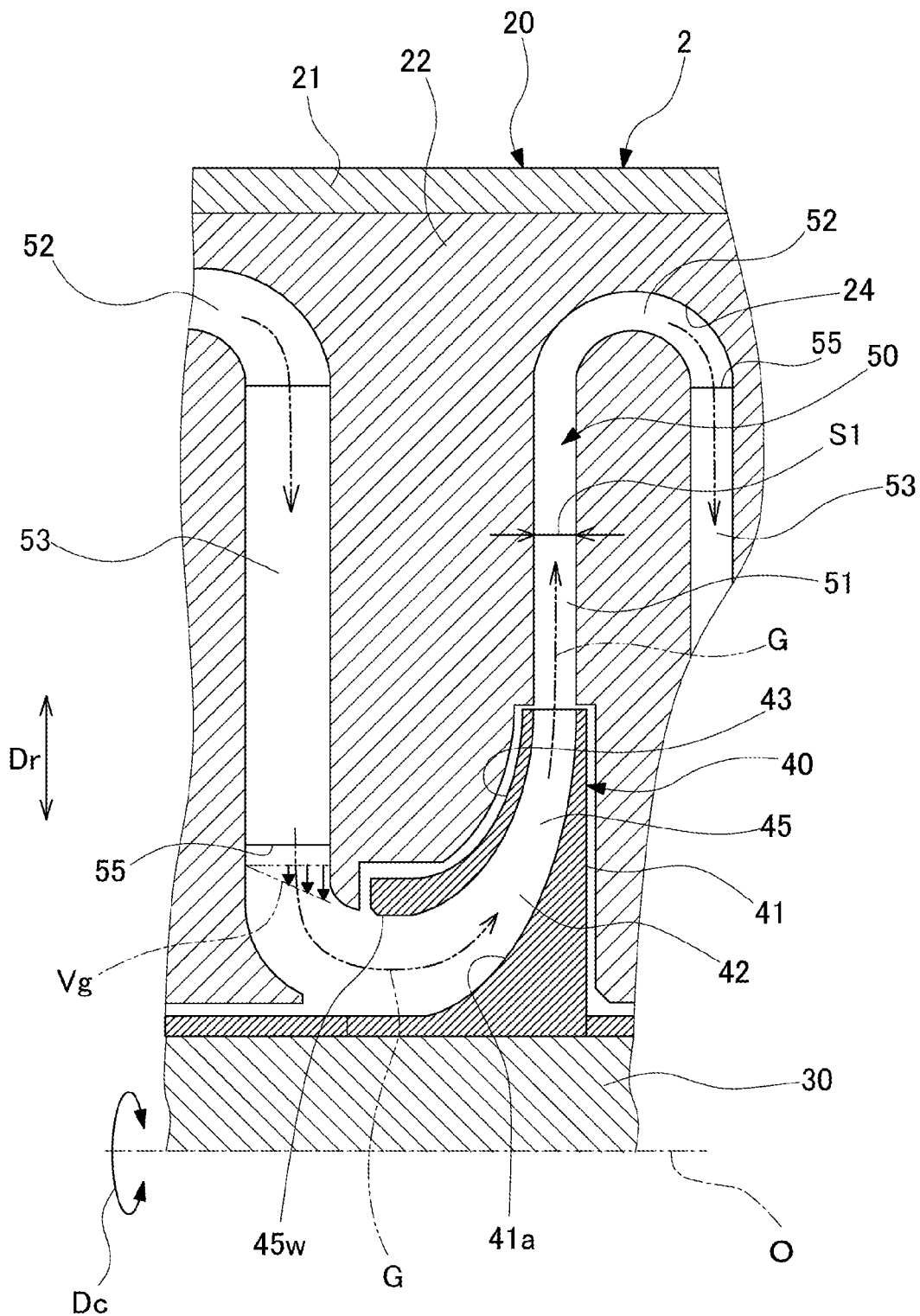
FIG. 2 is a sectional view illustrating a configuration of a main part of the centrifugal compressor.

As illustrated in FIG. 1, a compressor system 1 includes a centrifugal compressor 2 and a turbine apparatus 3 that drives the centrifugal compressor 2. For example, the turbine apparatus 3 is a steam turbine or a gas turbine.

For example, the compressor system 1 is used for an ethylene plant that separates and purifies a raw material such as naphtha to produce ethylene. In this case, a gas G containing propylene produced in a process of producing the ethylene is supplied to the centrifugal compressor 2. In addition, for example, the compressor system 1 may be used for an LNG plant. In this case, the gas G used for an LNG liquefaction process and containing propane (C3) is supplied to the centrifugal compressor 2.

(Configuration of Centrifugal Compressor)

The centrifugal compressor 2 compresses the supplied gas G. As illustrated in FIG. 2, the centrifugal compressor 2 mainly includes a casing 20, a rotary shaft 30, and an impeller 40.

The casing 20 is provided to surround the impeller 40. The casing 20 includes an external casing 21 forming a turbine cylinder and a plurality of diaphragms 22 disposed inside the external casing 21. The external casing 21 has a cylindrical shape extending in a direction of an axis O of the rotary shaft 30. The plurality of diaphragms 22 are arranged inside the external casing 21 in the direction of the axis O of the rotary shaft 30. In addition, the casing 20 has an internal space 24 whose diameter repeatedly increases and decreases. The impeller 40 is accommodated in the internal space 24.

In the casing 20, a casing flow path 50 through which the gas G flowing in the impeller 40 is caused to flow from an upstream side to a downstream side is formed at a position between the impellers 40. One end portion of the casing 20 has a suction port (not illustrated) through which the gas G is caused to flow into the casing flow path 50 from the outside. In addition, the other end portion of the casing 20 has a discharge port (not illustrated) formed continuously with the casing flow path 50, and through which the gas G is caused to flow outward.

The rotary shaft 30 extends in the direction of the axis O inside the casing 20. Both end portions of the rotary shaft 30 in the direction of the axis O are supported by bearings (not illustrated) provided in the casing 20 so that the rotary shaft 30 are rotatable around the axis O. The rotary shaft 30 is connected to an output shaft 3s (refer to FIG. 1) of the turbine apparatus 3 outside the casing 20. The rotary shaft 30 is rotationally driven around the axis O by transmitting a rotational force of the output shaft 3s rotating when the turbine apparatus 3 is operated.

A plurality (a plurality of stages) of the impeller 40 are provided inside the casing 20 at an interval in the axis O direction of the rotary shaft 30. In FIG. 2, only one (one stage) of the impellers 40 is illustrated. Each of the impellers 40 is fixed to the rotary shaft 30. Each of the impellers 40 rotates around the axis O together with the rotary shaft 30. For example, each of the impellers 40 is a so-called closed impeller including a disk 41, a blade 42, and a cover 43.

The disk 41 has a substantially circular cross section when viewed in the direction of the axis O. The disk 41 is formed so that a radial dimension gradually increases from one side toward the other side in the direction of the axis O, thereby forming a substantially conical shape.

The blade 42 is provided on a surface 41a facing the upstream side (left side of the drawing in FIG. 2), out of both surfaces of the disk 41 in the direction of the axis O. A plurality of the blades 42 are provided at an interval in a circumferential direction Dc around the axis O. The plurality of blades 42 are radially arranged outward in a radial direction Dr around the axis O. In a case where the plurality of blades 42 are viewed in the direction of the axis O, the plurality of blades 42 are curved from one side toward the other side in a circumferential direction Dc.

The cover 43 is provided to cover the plurality of blades 42 from the upstream side in the direction of the axis O. The cover 43 is provided in an end edge on the upstream side of the plurality of blades 42. In other words, the plurality of blades 42 are interposed between the cover 43 and the disk 41 in the direction of the axis O. In this manner, an impeller flow path 45 is formed among the cover 43, the disk 41, and a pair of blades 42 adjacent to each other.

The casing flow path 50 includes a diffuser part 51, a return bend part 52, and a return flow path 53. The diffuser part 51 extends outward in the radial direction Dr from an outer peripheral portion of the impeller 40. The return bend part 52 continuously extends to an outer peripheral portion of the diffuser part 51. The return bend part 52 is turned in a U-shape in a cross section from the outer peripheral portion of the diffuser part 51 and extends inward in the radial direction Dr. The return bend part 52 reverses and guides a flowing direction of the gas G flowing outward in the radial direction Dr in the diffuser part 51 from the impeller 40 so that the gas G flows inward in the radial direction Dr. The return flow path 53 extends inward in the radial direction Dr from the return bend part 52.

The return flow path 53 has a plurality of return vanes 55. The plurality of return vanes 55 are radially arranged at an interval around the axis O in the circumferential direction Dc. Each of the return vanes 55 has an airfoil shape, and both ends in the direction of the axis O are in contact with the diaphragms 22 of the casing 20 forming the return flow path 53.

In the centrifugal compressor 2 as described above, the gas G is introduced into the casing flow path 50 from a suction port (not illustrated). The gas G flows into the impeller flow path 45 of the impeller 40 rotating around the axis O together with the rotary shaft 30 from the upstream side in the direction of the axis O. The gas G is pumped and compressed outward of the impeller flow path 45 in the radial direction Dr by the rotation of the impeller 40 around the axis O. The compressed gas G is discharged outward in the radial direction Dr from the impeller flow path 45 of the impeller 40.

The gas G flowing out from the impeller 40 in each stage flows outward in the radial direction Dr through the diffuser part 51 of the casing flow path 50, and the flowing direction is turned back in the return bend part 52. The gas G passes through the return flow path 53 and is fed to the impeller 40 in the rear stage side. In this way, the gas G is compressed in multiple stages by flowing through the plurality of impeller flow paths 45 and the casing flow path 50 from one end portion side toward the other end portion side of the casing 20 and is fed out from a discharge port (not illustrated).

(Gas Compressed by Centrifugal Compressor)

In the centrifugal compressor 2, as described above, the gas G to be compressed is the gas G containing propylene or the gas G containing propane, for example. The gas G has a molecular weight of 30 or higher. Specifically, the gas G containing the propylene has the molecular weight of approximately 42. The gas G containing the propane has the molecular weight of approximately 41. Therefore, in a case where the gas G containing the propylene or the gas G containing the propane is caused to flow, the molecular weight of the gas G is 30 or higher even when impurities other than the propylene or the propane are mixed.

(Condition Satisfied by Impeller)

In the centrifugal compressor 2 that compresses the gas G having the high molecular weight, at least one of the impellers 40 provided in the plurality of stages satisfies the following three conditions.

(Condition 1)

In the impeller 40, a design point of the flow rate coefficient $\varphi$ is 0.1 to 0.2, and the machine Mach number M0 is 1.1 to 1.3. Here, the machine Mach number M0 is expressed by the following Equation (11).

$$\text{(Machine Mach number } M0\text{)} = \text{(Relative Velocity of Gas(Impeller Peripheral Velocity))/(Sonic Velocity of Gas)} \qquad (11)$$

(Condition 2)

Figure 3:
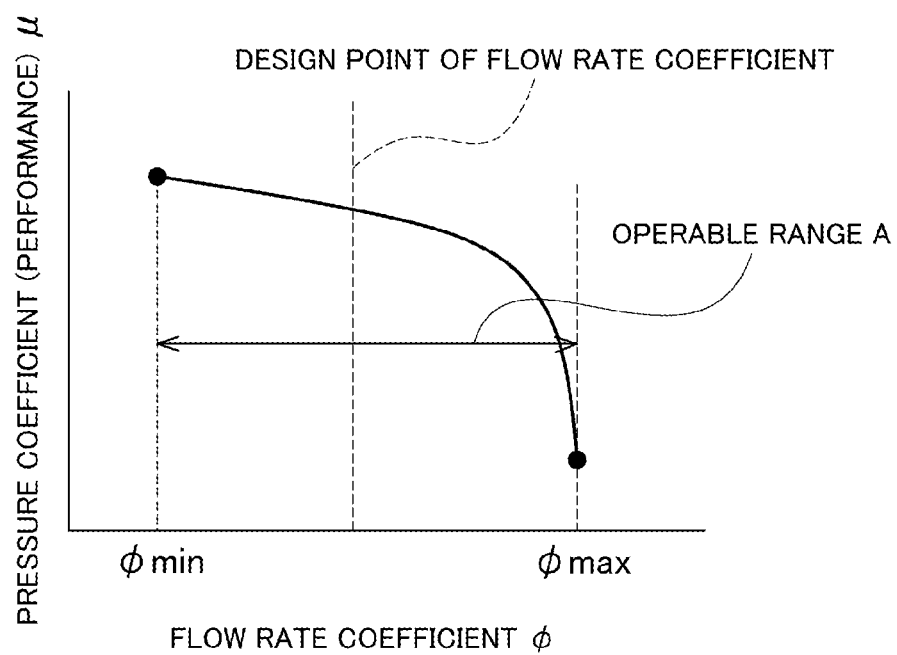
FIG. 3 is a view for describing an operation range in the centrifugal compressor.

In addition, as illustrated in FIG. 3, the impeller 40 is configured to be operable in a range A between a flow rate coefficient minimum value $\varphi$min and a flow rate coefficient maximum value $\varphi$max. Here, the flow rate coefficient minimum value $\varphi$min is a flow rate coefficient when performance (pressure coefficient $\mu$) of the centrifugal compressor 2 is maximized. The flow rate coefficient maximum value $\varphi$max is a flow rate coefficient when a choke phenomenon occurs so that an operation can be performed no longer in a case where the flow rate coefficient is gradually increased.

(Condition 3)

In addition, in the impeller 40, an operation range expressed by the following Equation (12) is 30% or higher.

$$\text{(Operation Range)} = \{\text{(Flow Rate Coefficient Maximum Value } \varphi\text{max)} - \text{(Flow Rate Coefficient Minimum Value } \varphi\text{min)}\}/\text{(Flow Rate Coefficient Maximum Value } \varphi\text{max)} \qquad (12)$$

For example, in order to satisfy the above-described conditions 1 to 3, an outlet width S1 of the diffuser part 51 connected to an outlet of the impeller flow path 45 in the impeller 40 is narrowed.

In addition, for example, a curvature of a flow path wall surface 45w on the outer side in the radial direction Dr may be increased in an inlet of the impeller flow path 45 which serves as a flow path for introducing the gas G into the impeller 40 (including a configuration in which the flow path wall surface 45w is formed to be a straight line extending in the direction of the axis O). In this manner, acceleration of the gas G is suppressed on the inlet side of the impeller 40.

In addition, for example, an angle, a shape, or a dimension of the return vane 55 provided in the return flow path 53 is adjusted. In this manner, a swirl may be generated in the flow of the gas G flowing from the return flow path 53 to the impeller flow path 45 of the impeller 40, and a relative flow velocity with respect to the impeller 40 may be suppressed. As illustrated in FIG. 2, it is preferable to generate the swirl so that the flow velocity distribution Vg of the gas G flowing from the return flow path 53 to the impeller 40 is higher on the downstream side in the direction of the axis O than that on the upstream side in the direction of the axis O.

(Operational Effect)

In the centrifugal compressor 2 having the above-described configuration, the design point of the flow rate coefficient φ of the impeller 40 may be a high value of 0.1 to 0.2, and the machine Mach number M0 may be a high value of 1.1 to 1.3. Therefore, even in a case where the flow rate of the compressed gas G is high, the performance of the centrifugal compressor 2 can be improved. Furthermore, since the performance of the centrifugal compressor 2 is improved, the centrifugal compressor 2 can be correspondingly downsized. In addition, the centrifugal compressor 2 can be operated so that the flow rate coefficient minimum value φmin is a lower limit. Accordingly, it is possible to suppress surging of the centrifugal compressor 2 which occurs at a flow rate lower than the flow rate coefficient minimum value φmin. Furthermore, the operation range of the centrifugal compressor 2 may be a wide range of 30% or higher. In this manner, the centrifugal compressor 2 can be efficiently operated in accordance with a usage environment. As a result, even in a case where the Mach number of the gas G is high, the performance can be improved while the operation range of the centrifugal compressor 2 can be secured.

In addition, in the centrifugal compressor 2 having the above-described configuration, the performance can be improved while the operation range can be secured in the centrifugal compressor 2 that compresses the gas G having the high molecular weight of 30 or higher.

In addition, in the centrifugal compressor 2 having the above-described configuration, the outlet width S1 of the impeller 40 is formed so that the operation range is 30% or higher. Therefore, the centrifugal compressor 2 can be efficiently operated in accordance with the usage environment.

In addition, in the centrifugal compressor 2 having the above-described configuration, even in a case of compressing the gas G having the high flow rate, having the high molecular weight, and containing the propylene produced in the ethylene plant, the performance can be improved while the operation range of the centrifugal compressor 2 can be secured.

In addition, in the centrifugal compressor 2 having the above-described configuration, even in a case of compressing the gas G having the high molecular weight, and containing the propane used for the LNG plant, the performance can be improved while the operation range of the centrifugal compressor 2 can be secured.

Modification Example of Embodiment

Hitherto, the embodiment of the present disclosure has been described in detail with reference to the drawings. However, a specific configuration is not limited to the embodiment and includes a design change within the gist not departing from the concept of the present disclosure. For example, although the configuration of each part of the centrifugal compressor 2 has been described as an example in the above-described embodiment, the configuration may be appropriately changed.

In addition, as the gas G, the gas G containing the propylene produced in the ethylene plant and the gas G containing the propane used for the LNG plant have been described as an example. However, without being limited thereto, the gas G may be a material other than those described above as the example.

In addition, in the above-described embodiment, the gas G having the molecular weight of 30 or higher is compressed. However, the gas G having the molecular weight lower than 30 may be compressed.

In addition, in order for the impeller 40 to satisfy the above-described conditions 1 to 3, the outlet width S1 of the diffuser part 51, the curvature of the flow path wall surface 45w on the inlet side of the impeller flow path 45, and the angle, the shape, or the dimension of the return vane 55 are adjusted. However, a configuration other than those described above as an example in the above-described embodiment may be adjusted.

APPENDIX

For example, the centrifugal compressor 2 described in the embodiment is understood as follows.

(1) The centrifugal compressor 2 according to a first aspect includes the rotary shaft 30 rotating around the axis O, and the plurality of impellers 40 fixed to and integrally rotating with the rotary shaft 30 so that the gas G flowing from the upstream side in the direction of the axis O is compressed by being pumped outward in the radial direction Dr. At least one of the plurality of impellers 40 has the design point of the flow rate coefficient φ which is 0.1 to 0.2, and a machine Mach number M0 of 1.1 to 1.3. At least one of the plurality of impellers 40 is configured to be operable between the flow rate coefficient minimum value φmin and the flow rate coefficient maximum value φmax.

The operation range expressed by the following Equation (a) is 30% or higher.

$$\text{(Operation Range)} = \{\text{(Flow Rate Coefficient Maximum Value } \varphi\text{max)} - \text{(Flow Rate Coefficient Minimum Value } \varphi\text{min)}\}/\text{(Flow Rate Coefficient Maximum Value } \varphi\text{max)} \quad \text{(a)}$$

According to this configuration, the design point of the flow rate coefficient φ of the impeller 40 is set to a high value of 0.1 to 0.2, and the machine Mach number M0 is set to a high value of 1.1 to 1.3. In this manner, even in a case where the flow rate of the compressed gas G is high, the performance of the centrifugal compressor 2 can be improved. Since the performance of the centrifugal compressor 2 is improved, the centrifugal compressor 2 can be correspondingly downsized. In addition, the centrifugal compressor 2 can be operated so that the flow rate coefficient minimum value φmin is a lower limit. Accordingly, it is possible to suppress surging of the centrifugal compressor 2 which occurs at a flow rate lower than the flow rate coefficient minimum value φmin. Furthermore, the operation range of the centrifugal compressor 2 is set to a wide range of 30% or higher. In this manner, the centrifugal compressor 2 can be efficiently operated in accordance with a usage environment. As a result, even in a case where the Mach number of the gas G is high, the performance can be improved while the operation range of the centrifugal compressor 2 can be secured.

(2) In the centrifugal compressor 2 according to a second aspect, in the centrifugal compressor 2 according to (1), the gas G may have the molecular weight of 30 or higher.

According to this configuration, in the centrifugal compressor 2 that compresses the gas G having the high molecular weight of 30 or higher, the performance can be improved while the operation range can be secured.

(3) In the centrifugal compressor 2 according to a third aspect, in the centrifugal compressor 2 according to (1) or (2), the outlet width S1 of the impeller 40 may be formed so that the operation range is 30% or higher.

Since the outlet width S1 of the impeller 40 is formed so that the operation range is 30% or higher, the centrifugal compressor 2 can be efficiently operated in accordance with a usage environment.

(4) In the centrifugal compressor 2 according to a fourth aspect, in the centrifugal compressor 2 according to any one of (1) to (3), the gas G may contain the propylene produced in the ethylene plant.

According to this configuration, the gas G containing the propylene produced in the ethylene plant has the high flow rate and the high molecular weight. However, even in this case, the performance can be improved while the operation range of the centrifugal compressor 2 can be secured.

(5) In the centrifugal compressor 2 according to a fifth aspect, in the centrifugal compressor 2 according to any one of (1) to (3), the gas G may contain the propane used for the LNG plant.

According to this configuration, the gas G containing the propane used for the LNG plant has the high flow rate and the high molecular weight. However, even in this case, the performance can be improved while the operation range of the centrifugal compressor 2 can be secured.

According to the centrifugal compressor of the present disclosure, even in a case where the Mach number of the gas is high, performance can be improved while the operation range is secured.

EXPLANATION OF REFERENCES 1 compressor system
2 centrifugal compressor
3 turbine apparatus
3s output shaft
20 casing
21 external casing
22 diaphragm
24 internal space
30 rotary shaft
40 impeller
41 disk
42 blade
43 cover
45 impeller flow path
45w flow path wall surface
50 casing flow path
51 diffuser part
52 return bend part
53 return flow path
55 return vane
A range
Dc circumferential direction
Dr radial direction
G gas
M0 machine Mach number
O axis
S1 outlet width
Vg flow velocity distribution
μ pressure coefficient
φ flow rate coefficient
φmax flow rate coefficient maximum value
φmin flow rate coefficient minimum value

What is claimed is:

1. A centrifugal compressor comprising:
a rotary shaft which is configured to rotate around an axis; and
a plurality of impellers fixed to and which is configured to integrally rotate with the rotary shaft so that a gas flowing from an upstream side in an axial direction is compressed by being pumped outward in a radial direction, wherein
one or more of the plurality of impellers:
has a design point of a flow rate coefficient φ which is 0.1 to 0.2, and a machine Mach number M0 of 1.1 to 1.3,
is configured to be operable between a flow rate coefficient minimum value φmin that maximizes performance (pressure coefficient μ) of the centrifugal compressor and a flow rate coefficient maximum value φmax that causes a choke phenomenon and renders the centrifugal compressor inoperable, and
has an operation range, expressed as (φmax−φmin)/φmax, that is 30% or higher, and
a molecular weight of the gas is 30 or higher.

2. The centrifugal compressor according to claim 1, wherein an outlet width of the one or more impellers is formed so that the operation range is 30% or higher.

3. The centrifugal compressor according to claim 1, wherein the gas contains propylene produced in an ethylene plant.

4. The centrifugal compressor according to claim 1, wherein the gas contains propane used for an LNG plant.

* * * * *